(No Model.)

J. MILLER.
REFRIGERATOR.

No. 264,184. Patented Sept. 12, 1882.

Witnesses:
Geo. H. Strong
L. H. Rouse

Inventor
James Miller
by Dewey & Co.
Attorneys

UNITED STATES PATENT OFFICE.

JAMES MILLER, OF OAKLAND, CALIFORNIA.

REFRIGERATOR.

SPECIFICATION forming part of Letters Patent No. 264,184, dated September 12, 1882.

Application filed May 27, 1882. (No model.)

*To all whom it may concern:*

Be it known that I, JAMES MILLER, of Oakland, county of Alameda, State of California, have invented an Improved Refrigerator; and I hereby declare the following to be a full, clear, and exact description thereof.

My invention relates to the class of refrigerators; and it consists generally in the construction and arrangement of peculiar vessels, providing for the holding of the substance to be kept cool, a surrounding and underlying water-space, and a water-supply.

It consists particularly in a pan-like vessel, within which is set upon short legs a smaller vessel of smaller diameter and greater height. Between these a space is formed in which rests the base of a dome-shaped vessel, which is surmounted by a supply-vessel with a flaring base and provided with a cap, all of which will hereinafter fully appear.

The object of my invention is to provide a simple, economical, and effective refrigerating device for containing any substance or article which should be kept cool.

Figure 1:
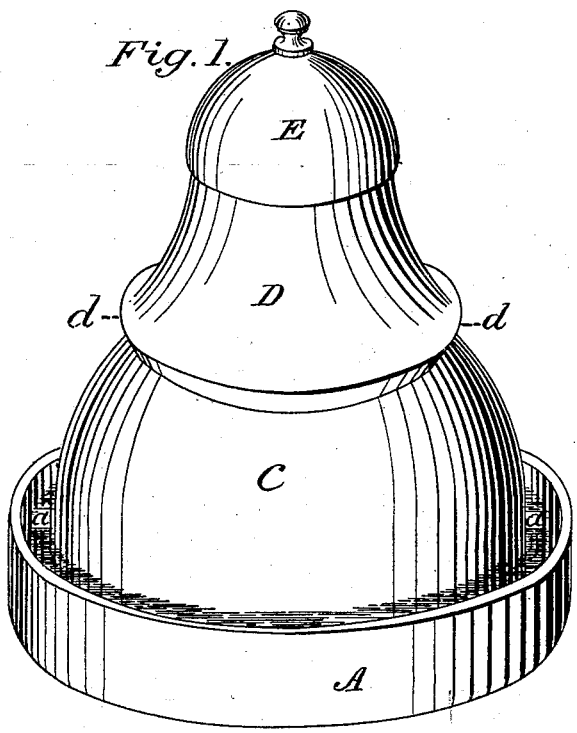
Figure 2:
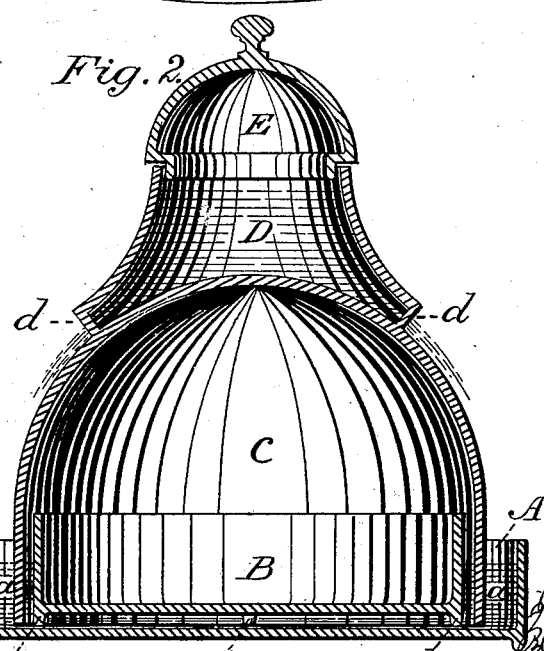

Referring to the accompanying drawings, Figure 1 is a perspective view, and Fig. 2 is a vertical section.

Let A represent a dish or pan with vertical sides.

B is a similar vessel of smaller diameter, which is provided with legs $b$ and is set within vessel A.

A space, $a$, is left between the rims and bottom of the two vessels. The interior vessel is higher than the exterior one, which may be the result either of the construction of the vessel itself or of raising it upon legs, as shown.

C is a bell or dome shaped vessel fitting between the two vessels A and B in the circumscribing space $a$, its base resting upon the bottom of vessel A.

Above the vessel C, formed with it or supported by it, is a somewhat cylindrical vessel, D, with curved sides and a flaring base, $d$, which follows for a short distance the curve of the dome-vessel C. Its top is provided with an ordinary cap or cover, E.

The entire device is to be made preferably of terra-cotta unglazed, though I do not confine myself to this material, as other substances would answer, though not so well.

In case the supply-vessel D is made (as I prefer it should be) of what is known as "open porous terra-cotta," no further provision need be made for the escape or discharge of the water, as it will seep through the pores; but when it is made of a close porous clay or of metal small apertures will have to be made in the base of the flaring flange $d$. The supply-vessel D is to have a capacity about equal to the water-space $a$.

To use the refrigerator I place the substance to be kept cool—say, for example, butter—in the interior dish, B. I then pour water into the water-space $a$, surrounding and beneath the holding-vessel. On account of the greater height of the latter the water would never flow over into it, but would discharge, in case of a too copious supply, over the edge of the exterior vessel, A. I then lift the vessel C, with its supply-vessel D, and place it down in the water-space, as shown. Removing the cap E, I fill the supply-vessel D with water. The water will in time seep through the base of the flaring flange $d$ around its entire circumference, and will flow down over the exterior of the dome-shaped vessel C into the water-space. This gradual flow will keep the vessel C cool, and will supply the water-space either entirely to commence with or will keep it full, supplying its loss by evaporation, &c. The supply-vessel being regularly filled with water through its open top, the operation of the device will continue.

The dome-shaped vessel C allows plenty of air within, and may be readily removed for access to the butter.

I am aware that heretofore various constructions of refrigerators have been made involving the use of porous vessels through which percolates water, and hence I confine myself to my precise construction.

Having thus described my invention, what I claim as new, and desire to secure by Letters Patent, is—

A refrigerator consisting of the exterior vessel, A, and interior holding-vessel, B, of greater height and smaller diameter, and set upon legs $b$ within vessel A, whereby a water-space, $a$, is formed around and under said holding-vessel B, the dome or bell shaped vessel C, the base of which fits down into the circumscribing water-space, and the water-supply vessel D, with its flaring flange $d$, upon top of the vessel C, substantially as herein described.

In witness whereof I hereunto set my hand.

JAMES MILLER.

Witnesses:
C. D. COLE,
J. H. BLOOD.